No. 881,329.
PATENTED MAR. 10, 1908.
S. NAGASSE.
FRUIT AND VEGETABLE PARER AND SLICER.
APPLICATION FILED FEB. 28, 1907.
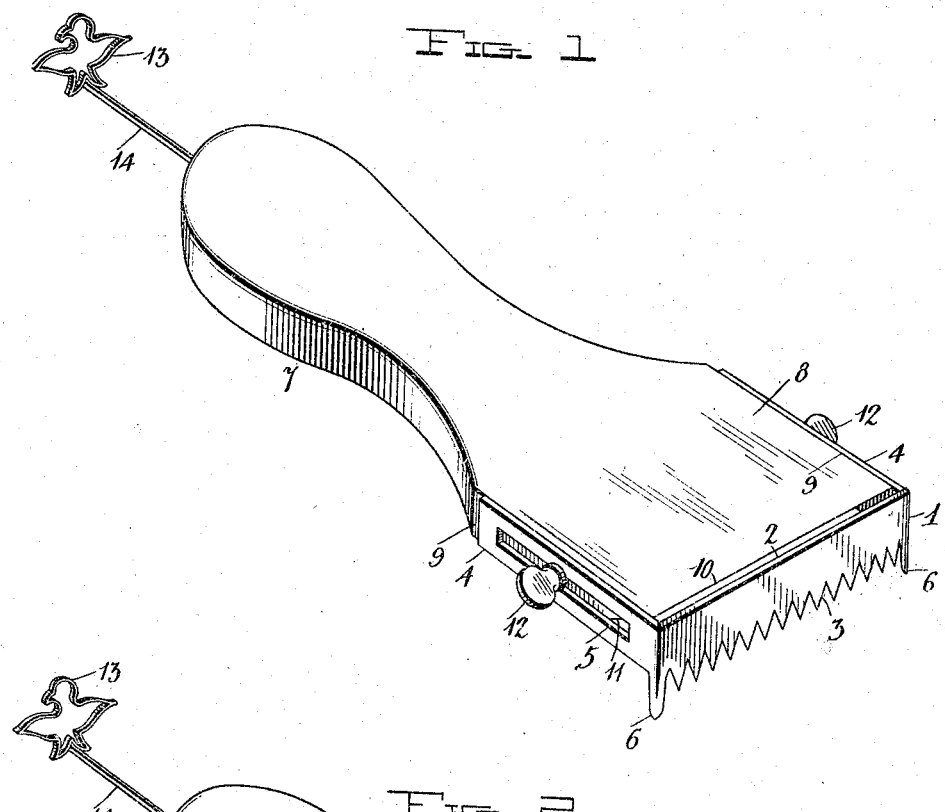
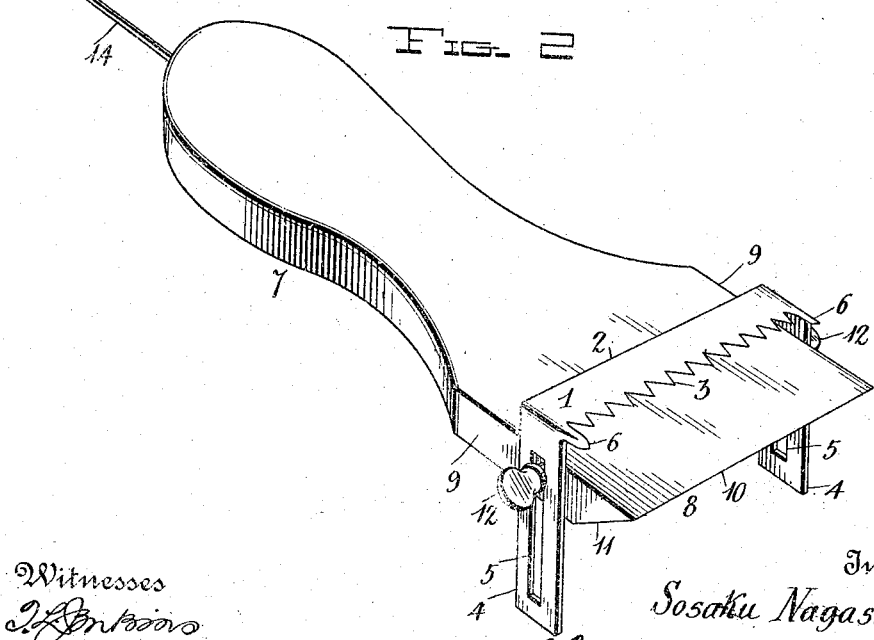
Witnesses
Inventor
Sosaku Nagasse

UNITED STATES PATENT OFFICE.

SOSAKU NAGASSE, OF LOS ANGELES, CALIFORNIA.

FRUIT AND VEGETABLE PARER AND SLICER.

No. 881,329.  Specification of Letters Patent.  Patented March 10, 1908.

Application filed February 28, 1907. Serial No. 359,929.

*To all whom it may concern:*

Be it known that I, SOSAKU NAGASSE, a subject of the Emperor of Japan, residing at Los Angeles, in the county of Los Angeles and State of California, have invented certain new and useful Improvements in Fruit and Vegetable Parers and Slicers; and I do declare the following to be a full, clear, and exact description of the invention, such as will enable others skilled in the art to which it appertains to make and use the same.

My invention is an improved fruit and vegetable peeler, scraper and slicer similar in construction to my prior application, Serial No. 321,410, and it consists in the construction, combination and arrangement of devices hereinafter described and claimed.

In the accompanying drawings,—Figure 1 is a perspective view of an implement embodying my invention, showing the same arranged for use in peeling and scraping fruit and vegetables; and Fig. 2 is a similar view showing the same arranged for use for slicing fruits and vegetables.

The blade 1 of my improved implement is provided at one side with a sharpened edge 2 for slicing and peeling, and is provided at the opposite side with a serrated edge 3 for scraping. At the ends of the said blades are a pair of parallel arms 4, each of which has a longitudinal slot 5. At the corners formed by the union of the said arms with the ends of the blade and at the serrated edge of the latter are projecting cutter points 6, which are employed for taking out the eyes of potatoes.

In connection with the blade I employ a handle 7, which has a broadened end 8 provided with parallel sides 9 and having its outer end 10 beveled on one side, as at 11. The arms 4 of the blade engage the parallel sides 9 of the broadened end of the handle, and the said blade is adjustably and pivotally connected to the handle by set screws 12, which operate in the slots 5.

For peeling and scraping purposes, the blade is secured to the handle 7, as shown in Fig. 1, with its arms 4 parallel with the handle and its cutting edge adjusted to an appropriate distance from the edge 10 of the handle. The bevel 11 of the handle readily clears the peelings which pass between the cutting edge 2 and the end 10. By adjusting the blade toward or from the end 10, which may be readily done by means of the set screws 12 in the slotted arms 4, the thickness of the peelings may be predetermined and hence waste of fruit or vegetables avoided.

In order to use the implement for slicing purposes, the blade must be turned with one of its flat sides disposed opposite one of the flat sides of the handle and with its arms 4 disposed at right angles to the handle, as shown in Fig. 2. The blade may be set at any desired distance from the handle according to the required thickness of the slices.

At the outer end of the handle, I show a cutter 13, which is made of sharpened wire or the like, and may be in the shape of a bird, flower or any other suitable design, and is provided with a rod 14, which rod is inserted in the end of the handle. The said cutter 13 may be used for cutting vegetable or fruit slices or for making stamped figures on mashed potatoes, pats of butter, cakes and other articles.

From the foregoing description, taken in connection with the accompanying drawings, the construction and operation of the invention will be readily understood without requiring a more extended explanation.

Having thus described my invention, what I claim as new, and desire to secure by Letters-Patent is,—

1. An implement of the class described comprising a handle beveled at one end and having a longitudinal side at an angle to said beveled end, in combination with a blade spaced from and extending across said beveled end and having a slotted arm connected by a set screw to said longitudinal side of the handle for longitudinal and pivotal movement with respect thereto to enable said blade to be adjusted toward and from said beveled end of the handle and to be also disposed at an angle with respect to the handle, substantially as described.

2. The herein-described fruit and vegetable peeler, scraper and slicer comprising the blade having the sharpened edge at one side, a serrated scraping edge at its opposite side, eye-cutting points at its ends, parallel slotted arms extending from its ends, in combination with a handle beveled at one end having parallel sides for engagement by the arms of the blade, and set-screws adjustably securing said blade to the handle and operating in said slotted arms of said blade, substantially as set forth.

In testimony whereof I have hereunto set my hand in presence of two subscribing witnesses.

SOSAKU NAGASSE.

Witnesses:
G. E. HARPHAM,
S. B. AUSTIN.